UNITED STATES PATENT OFFICE.

B. F. PETTINGILL, OF NEWBURYPORT, MASSACHUSETTS.

IMPROVED CEMENT FOR LEATHER.

Specification forming part of Letters Patent No. 52,315, dated January 30, 1866.

*To all whom it may concern:*

Be it known that I, BENJAMIN F. PETTINGILL, of Newburyport, in the county of Essex and State of Massachusetts, have invented a new and useful cement or composition to be used for cementing pieces or articles of leather or other materials; and I do hereby declare the same, and the ingredients thereof, and the proportions of such ingredients, and the manner of compounding such composition to be hereinafter fully described—that is to say:

The said composition is composed of caoutchouc, naphtha, and sulphur.

In making a quantity of it I take one-half an ounce of caoutchouc, one-half a pint of naphtha, (whether such be that derived from coal or that obtained from petroleum,) and one-sixteenth of an ounce of flour of sulphur. Next, in a suitable vessel I put the said ingredients and stir them well occasionally until the caoutchouc and the sulphur are thoroughly dissolved by the naphtha, after which the composition will be formed and ready for use.

I do not confine my invention to the precise proportions of its ingredients as hereinbefore given, as they may be somewhat varied and still be productive of good results.

This composition has been found of great advantage as a cement for attaching pieces or articles of leather together, it being specially useful in the manufacture or repairing of shoes, harnesses, pulley-bands, and trunk-coverings.

In using it it is to be thinly spread on or both of the surfaces to be united, after which they are to be pressed together. In a few minutes the cement will become set and they will be very thoroughly or strongly connected by it.

The sulphur not only facilitates the dissolution of the caoutchouc, but also renders the composition more adhesive and particularly resistive to heat and moisture.

I am aware that naphtha has been long used as a solvent of caoutchouc, therefore I do not claim naphtha and caoutchouc alone, as without the sulphur the composition is of little or no value in comparison to what it is when the sulphur is employed in it.

I claim—

The combination made of the ingredients, and in the manner, and for the purpose substantially as hereinbefore explained.

B. F. PETTINGILL.

Witnesses:
 F. P. HALE, Jr.,
 G. H. WASHBURN.